United States Patent [19]
Hajdukiewicz et al.

[11] Patent Number: 5,327,657
[45] Date of Patent: Jul. 12, 1994

[54] TOUCH PROBE

[75] Inventors: Peter Hajdukiewicz, Wotton-Under-Edge; Graham A. Hellen, Bristol; Peter K. Hellier, North Nibley; John C. Dabbs, Chepstow; David R. McMurtry, Wotton-Under-Edge, all of United Kingdom

[73] Assignee: Renishaw Metrology Ltd., Gloucestershire, United Kingdom

[21] Appl. No.: 973,747

[22] Filed: Nov. 9, 1992

[30] Foreign Application Priority Data

| Jul. 11, 1991 | [GB] | United Kingdom | 9114945 |
| Nov. 9, 1991 | [GB] | United Kingdom | 9123853 |
| Nov. 21, 1991 | [GB] | United Kingdom | 9124777 |
| Jul. 22, 1992 | [GB] | United Kingdom | 9215512 |

[51] Int. Cl.$^5$ ............................................. G01B 5/03
[52] U.S. Cl. ........................................ 33/503; 33/556; 33/559; 33/DIG. 10
[58] Field of Search ................. 33/503, 504, 556, 557, 33/558, 559, 560, 561, DIG. 10

[56] References Cited

U.S. PATENT DOCUMENTS

| 4,153,998 | 5/1979 | McMurtry . |
| 4,349,946 | 9/1982 | McMurtry . |
| 4,567,659 | 2/1986 | Kitamura ............................ 33/503 |
| 4,649,623 | 3/1987 | Schneider et al. . |
| 4,693,110 | 9/1987 | Juengel ............................... 33/558 |
| 4,813,151 | 3/1989 | Hajdukiewicz et al. . |
| 4,916,825 | 4/1990 | Breyer . |
| 4,938,083 | 7/1990 | Gurny et al. . |
| 5,024,003 | 6/1991 | Breyer . |
| 5,028,901 | 7/1991 | Enderle et al. . |
| 5,041,806 | 8/1991 | Enderle et al. . |
| 5,056,235 | 10/1991 | Thomas ............................. 33/503 |

FOREIGN PATENT DOCUMENTS

| 0243766 | 11/1987 | European Pat. Off. . |
| 0304881A1 | 3/1989 | European Pat. Off. . |
| 0406781 | 1/1991 | European Pat. Off. . |
| 0406782A1 | 1/1991 | European Pat. Off. . |
| 0426492 | 5/1991 | European Pat. Off. . |
| 0501710A1 | 9/1992 | European Pat. Off. . |
| 3811851A1 | 10/1989 | Fed. Rep. of Germany . |
| 9010591.5 | 11/1990 | Fed. Rep. of Germany . |
| WO91/13316 | 9/1991 | PCT Int'l Appl. . |
| 2163554 | 2/1986 | United Kingdom . |
| 2167559 | 5/1986 | United Kingdom . |

OTHER PUBLICATIONS

"Autochange Flexible Probing System for Co-ordinate Measuring Machines"; Renishaw Electrical Limited Sales Literature; Issue 1, Aug. 1984; pp. 1–29.
Automatic Probe Changer Enhances Measuring Machines; 123 Engineering, 226 (1986) Jul., Aug. No. 7/8, London, Great Britain, p. 517.

Primary Examiner—William A. Cuchlinski, Jr.
Assistant Examiner—G. Bradley Bennett
Attorney, Agent, or Firm—Oliff & Berridge

[57] ABSTRACT

A magazine has a plurality of storage ports 400 each of which retains a stylus module 314 for use in measuring workpiece dimensions on a coordinate measuring machine. Each storage port 400 is configured as a pair of jaws provided by docking inserts 414. A permanent magnet 418 is mounted on each docking insert 414. The lower casing of the stylus module 314 is urged against the inwardly facing edges 416 of the docking inserts 414 by the magnetic attraction force due the magnets 418. The stylus module 314 is engaged with a retaining module (on the quill of the machine) by moving the retaining module in a downward sense to engage the stylus module 314; further downward movement disengages the stylus module 314 from the storage port 400, thus enabling engagement of such a stylus module and removal of the module from the storage port in a single continuous movement.

18 Claims, 11 Drawing Sheets

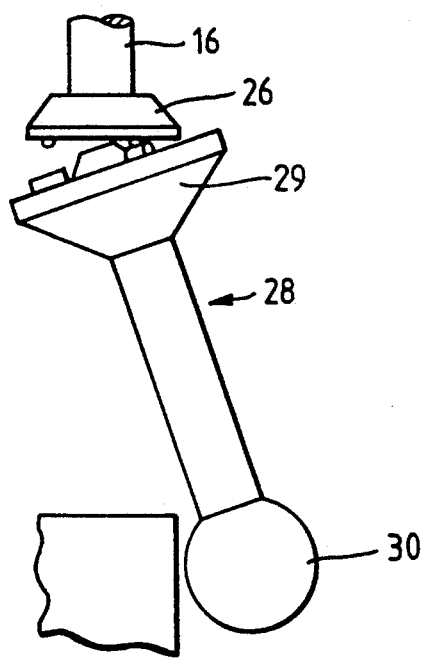
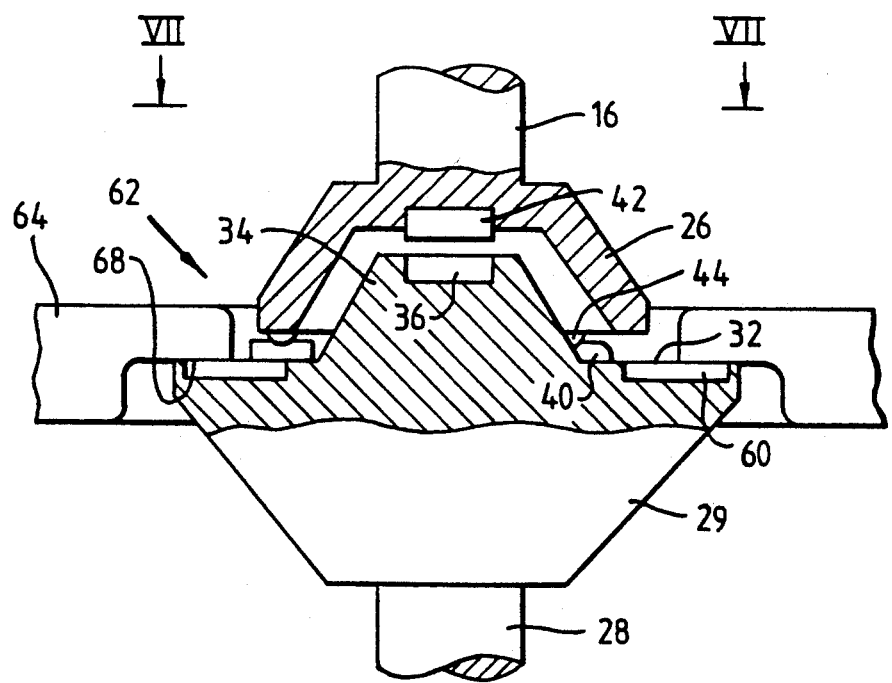

TOUCH PROBE

This is a Continuation-in-Part of PCT Application No. PCT/GB92/01244, filed Jul. 9, 1992.

BACKGROUND OF THE INVENTION

The present invention relates to a touch probe used, for example, on a coordinate positioning machine such as a machine tool or coordinate measuring machine.

Such probes are known from U.S. Pat. No. 4,153,998, and comprise a fixed structure by which the probe may be connected to the movable arm of the machine, relative to which a stylus having a measuring tip for contacting the workpiece is supported. The position of a workpiece surface is detected by operating the machine to drive the measuring tip of the stylus into contact with the surface whose position is to be measured, and detecting, with the probe, contact between the measuring tip and the surface. The probe emits a signal indicative of such contact, and this is used to record the position of the movable arm and to instruct the machine control to brake its movement. In order to prevent damage to the stylus when, during braking of its movement, the movable arm overtravels the point of contact between the stylus tip and surface, the stylus is carried on a stylus-supporting member which is supported on the fixed structure in a rest location, out of which it may be displaced when a deflecting force is applied to the stylus, and to which it may return when the deflecting force is removed. This displacement of the stylus- supporting member is known as "overtravel displacement". Good positional repeatability of the stylus-supporting member relative to the fixed structure from one overtravel displacement to the next is required in order that the position of the surface may be measured accurately.

It is, on occasions, desirable to change the stylus carried by the probe. For example, the measurement of different features on a workpiece may require the use of different geometries and lengths of styli.

A system for changing styli is known from U.S. Pat. No. 4,649,623 and comprises a retaining member on the stylus-supporting member, on which a stylus selected from a magazine containing a number of different styli is magnetically retained. One stylus may be exchanged for another stylus in the magazine by using an electromagnet to neutralise the magnetic attraction forces between the retaining member and the stylus carried on the retaining member. Mutually engageable engagement elements on the retaining member and each stylus provide kinematic location of a given stylus on the retaining member, and thus good repeatability of the position of the measuring tip of each stylus relative to the retaining member from one stylus change operation to the next.

However, a fundamental problem with such systems is that mechanical hysteresis increases with the number of joints or support mechanisms which perform the function of locating the measuring tip relative to the fixed structure. Thus, for example, in the probe of U.S. Pat. No. 4,649,623 the stylus-supporting member is supported within the fixed structure in a kinematic rest position which provides overtravel displacement of the stylus during the course of a measuring operation, and a given stylus is supported on the stylus-supporting member in a further kinematic location which is broken and reformed when a stylus is removed and replaced during the course of an inspection cycle.

A first aspect of the present invention provides a system for changing styli on a probe in which a given stylus is interchangeably magnetically retained on a retaining member supported on the fixed structure of the probe, such that a single mechanical location between a given stylus and the retaining member performs both the function of locating the stylus on the retaining member during a stylus change operation, and providing overtravel displacement of the stylus during a measuring operation.

Accordingly, the present invention provides a touch probe for use on a coordinate positioning machine, comprising:
- a fixed structure by which the probe may be supported on a movable arm of the machine;
- a retaining member supported on the fixed structure;
- a stylus having a supporting body, a stem extending from the supporting body, and a sensing tip provided at a free end of the stem;
- means for releasably locating said supporting body in a repeatable rest position on said retaining member including magnetic biasing means for biasing said supporting body into said rest position, to enable exchange of one such stylus for another; wherein
- said releasable location means enables tilting displacement of said supporting body (and thus said stylus) out of said rest position in response to a displacing force on the stylus, and return of said supporting body to said rest position, under the influence of said magnetic biasing means.

To provide a truly flexible measuring system, a plurality of styli must be retained within the working area of the machine to enable automatic exchange of one stylus for another. A second independent aspect of the present invention relates to a storage system for retaining a plurality of task modules (such as a stylus as defined above) on a machine, wherein each of the task modules is interchangeably connectable to a retaining module (such as the fixed structure and retaining member) supported on the movable arm of the machine.

According to a second aspect of the present invention, a magazine is provided which includes a plurality of storage ports, each for supporting a task module, each said task module having a set of engagement elements, magnetising means being provided for urging said task module in a first direction into contact with said storage port, wherein said storage port and said task module are configured so that said engagement elements are accessible from a direction opposite to said first direction, and that, upon application to said task module of a force exceeding the force from the magnetising means, said task module may move relative to said support structure in said direction opposite to said first direction.

Such a magazine and task modules enable engagement of a task module by a retaining module, and disengagement of the task module from the storage port in a single continuous movement and without any additional machine apparatus (such as dedicated motors or electromagnets).

Typically a task module may be the supporting body, stem, and sensing tip of a stylus. However more complex forms of task module may be provided (e.g. a temperature sensor, an accelerometer or a pressure sensor) with, where required, an appropriate retaining module.

A further type of task module is disclosed in our copending European Patent Application No. EP-A-501,710. This application discloses a touch probe which has a task module in the form of a stylus module and a retaining module provided by a strain sensitive module having a load cell upon which the stylus module is interchangeably retainined. The stylus module has a casing, and a stylus supported relative to the casing in such a way as to enable overtravel displacement of the stylus relative to the casing. In this probe, contact between the sensing tip of the stylus and a workpiece is detected by sensing strain in the stylus (which occurs before overtravel displacement of the stylus supporting member) transmitted through the casing of the stylus module to the strain sensitive load cell. When this strain reaches a predetermined threshold electronic circuitry associated with the load cell causes the emission of a trigger signal to the machine control.

We have discovered however that an associated disadvantage exists with this modular construction of probe. If, due to an error in the part inspection program of the machine, the probe is driven so that the stylus module accidentally becomes detached from the strain sensitive retaining module (e.g. due to excessive overtravel), the probe no longer has the capacity to register a trigger without crashing the retaining module into a surface, and thus causing irreparable damage. In spite of this, the control of the machine will continue to operate the machine as if the probe is completely functional; evidently, this situation may result in serious damage to either the machine or the probe or both.

A third independent aspect of the present invention provides a probe including a retaining module and a stylus module which is releasably mountable to the retaining module, wherein the retaining module comprises means for detecting when a stylus module is mounted thereto, and for outputting an alarm signal accordingly.

The detecting means may be provided by any suitable mechanism e.g. a microswitch, an optical sensor or a magnetic sensor.

The alarm signal from the detecting means is used to instruct the machine control to arrest motion of the movable arm on which the retaining module is supported, and thus prevent any damage to either the machine or the retaining module. However, the generation of this alarm signal gives rise to a further problem in that, during a stylus changing operation, the machine is operated to deposit a stylus module in a vacant storage port of the magazine, and then to move the retaining module to a different storage port in order to engage a new stylus module. Inevitably, the retaining module does not carry a stylus module while it moves between two ports of the magazine in the course of a stylus changing operation; the detecting means will thus emit an alarm signal preventing movement, and effectively prevent automatic stylus changing.

A fourth aspect of the present invention relates to a magazine having means for sensing when a retaining module is in close proximity, and for outputting an inhibit signal (which overrides the effect of the alarm signal).

The machine may thus drive the movable arm during stylus changing, even though a stylus module is not mounted to the retaining module. Preferably the sensing means is provided on the magazine, and may e.g. be one or more light beams and/or a sensor for sensing electric or magnetic fields, such as a Hall Effect sensor.

The magazine is preferably mounted on a base supported on the machine, and is biased into a repeatable rest position with respect thereto, wherein further detecting means are provided for detecting deflection of the magazine relative to the base and for outputting a crash signal accordingly. Such deflection may be caused by accidental collision between a retaining module and the magazine during a stylus changing operation.

BRIEF DESCRIPTION OF DRAWINGS

Embodiments of the present invention will be now be described, by way of example, and with reference to the accompanying drawings in which:

FIG. 3 shows the operation of the probe in FIG. 1;

FIG. 4 shows a detail of FIG. 1 in conjunction with a first embodiment of a magazine;

DESCRIPTION OF PREFERRED EMBODIMENTS

Figure 1:
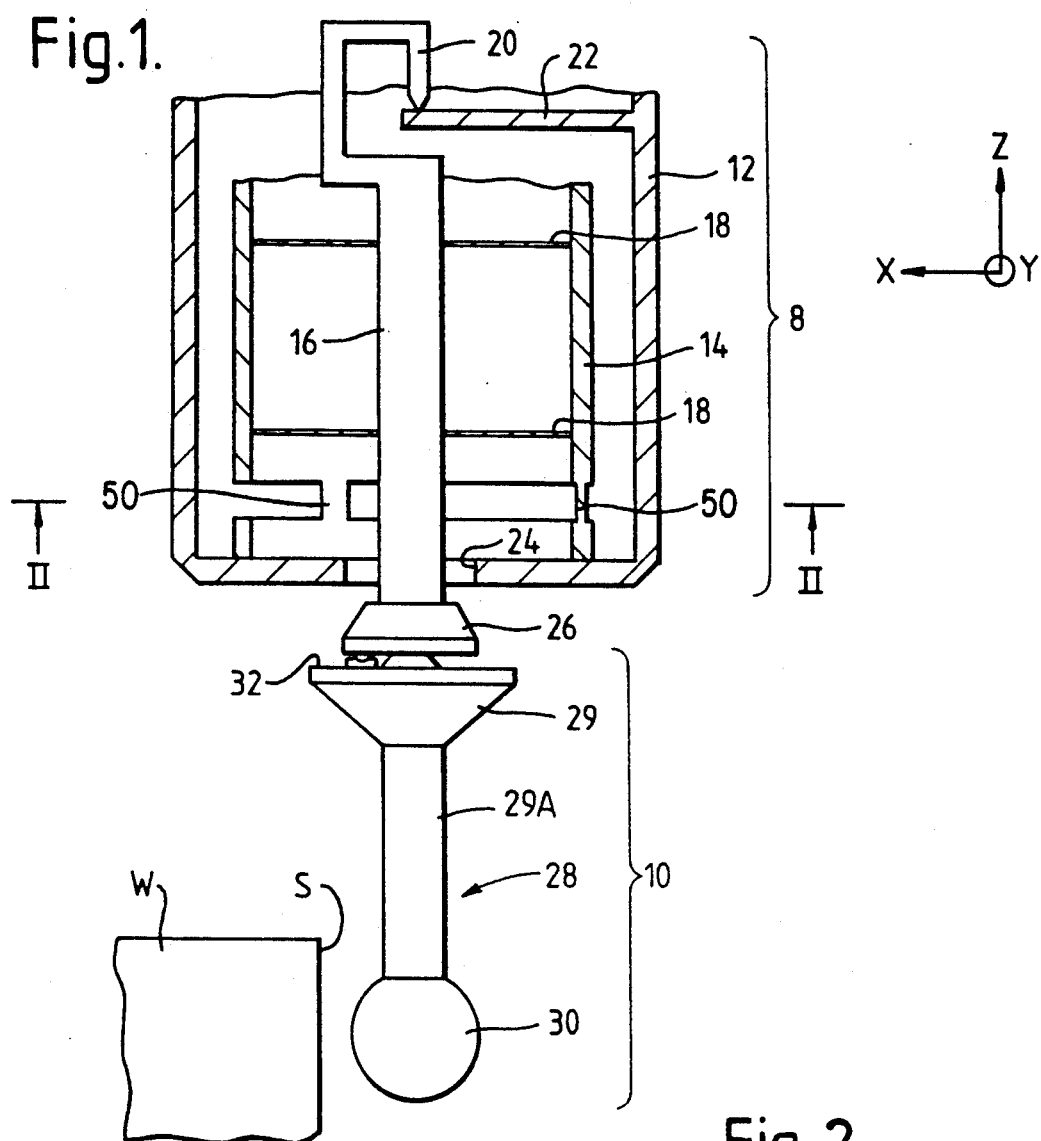
FIG. 1 shows a section through a first embodiment of stylus changing probe.
Figure 2:
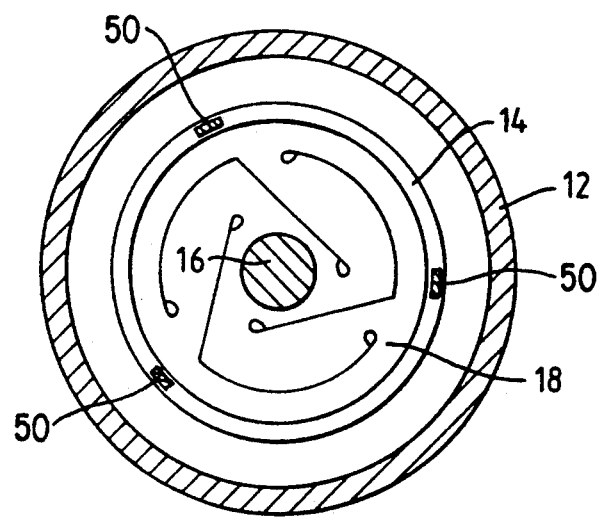
FIG. 2 shows a section on II—II in FIG. 1.

Referring now to FIGS. 1 and 2, a probe comprises, a retaining module 8 and a task module 10. The retaining module 8 has a fixed structure provided by a cylindrical housing 12 inside which a strain sensitive load cell in the form of a cylindrical cage 14 is supported. A retaining member 16 is supported within the cage 14 on two circular planar spring diaphragms 18, which restrict movement of the retaining member 16 to linear motion in a direction indicated in FIG. 1 as the Z direction. The connection of the retaining member 16 and diaphragms 18 is such that the diaphragms 18 bias a stop 20 on the retaining member 16 into contact with an inwardly depending flange 22 which extends from the housing 12. When the stop 20 is in abutment with the flange 22, the position of the retaining member 16 is precisely fixed in space relative to the fixed structure 12; the diaphragms 18 restrict rotational movement of the retaining member 16, and the position of the member 16 in the Z direction is fixed by the stop 20. The retaining member 16 projects through an aperture 24 in the base of the housing 12, and terminates at its free end in a frusto-conical flange 26 onto which the task module 10 in the form of a stylus 28 is releasably mountable.

Referring now to FIGS. 3 and 4, the stylus 28 includes a frusto-conical supporting body 29, and a stem 29A which has a spherical sensing tip 30 at its free end. The supporting body 29 has a circular face 32, and a frusto-conical boss 34 projecting upwardly therefrom in which a permanent magnet 36 is mounted. A set of engagement elements, provided by three rollers 40 are supported on the face 32. The rollers 40 are equispaced and extend radially with respect to the boss 34. A further set of engagement elements are provided on the flange 26, in the form of three pairs of balls 44. The magnet 36 cooperates with a magnet 42, retained in a recess of the circular face of the flange 26, to bias the stylus 28 into a mechanical location on the flange 26 of the retaining member 16. The mechanical location of the stylus 28 on the retaining member 16 is provided by engagement of each of the rollers 40 in the convergent surfaces provided by each of three pairs of balls 44 supported on the flange 26. The stylus 28 is thus kinematically supported on the flange 26 of the retaining member 16. The kinematic support provides good repeatability of the position of the stylus 28 relative to the retaining member 16; i.e. the stylus returns to the same position relative to the retaining member 16 after it has been displaced. Other forms of support which provide good repeatability may also be used.

The magnetic coupling between the retaining member 16 and the stylus 28 is such that the stylus 28 may be displaced from its kinematic rest position relative to the flange 26 (e.g. as illustrated in FIG. 3), and the magnetic biasing force between the magnets 36,42 will bias the stylus 28 back into its kinematically supported condition on the flange 26. Thus, with this embodiment of probe the measuring tip 30 of the stylus 28 may deflect in three dimensions relative to the housing 12 to accommodate overtravel displacement: by tilting movement of the stylus 28 in the X and Y directions relative to the retaining member 16, and movement of the retaining member relative to the housing 12 in the +Z direction, enabled by the resilience of the diaphragms 18.

The magnetic coupling also enables exchange of styli to completely remove a given stylus 28 from connection with flange 26, and subsequently to mount a further stylus 28. However this design does not as a consequence of this, increase the number of mechanical support mechanisms which serve to locate the measuring tip relative to the housing.

In a modification, the peripheries of the circular faces of both the flange 26 and supporting body 29 are made of ferromagnetic material to provide a magnetic flux path between flange 26 and body 29 at their peripheries. This increases the magnetic attraction forces between the stylus 28 and retaining member 16 when the probe is overtravelled and thus helps prevent the stylus 28 from becoming completely disconnected. Preferably each of the peripheries is made of a permanent magnetic material.

During a measuring operation, the purpose of which is for example to measure the position of the surface S on a workpiece W, the probe 10 is driven in e.g. the X direction by a machine to which the probe is connected (not shown). At the instant the measuring tip 30 of the stylus 28 comes into contact with the surface S a strain will be present in the stylus 28 and the retaining member 16; the strain is transmitted by diaphragms 18 to the cage 14. Areas of weakness in the form of pillars 50 provided at the base of the cage 14 support strain gauges (not shown) which sense this strain and output a signal accordingly. When the output from the strain gauges has reached a predetermined threshold a signal is sent to the machine indicating contact between the measuring tip 30 and surface S, from which the machine may determine the position of the surface S. This signal is also used to brake motion of the machine. (N.B. the cage and sensing mechanism are described in more detail in our U.S. Pat. No. 4,813,151). Other strain sensing mechanisms e.g. piezo may be used. Overtravel of the probe relative to the workpiece W after the signal has been sent to the machine is, as mentioned above, accommodated by tilting deflection of the stylus 28 relative to the retaining member 16. The magnetic force between the retaining member 16 and the stylus 28 is however such that the stylus 28 remains partially supported thereon (as illustrated in FIG. 3). When the machine has come to complete standstill, the probe is then driven in the reverse direction away from the surface S and the magnetic force between the retaining member 16 and the stylus 28 causes the stylus 28 to pivot back into position relative to the retaining member 16.

Figure 5:
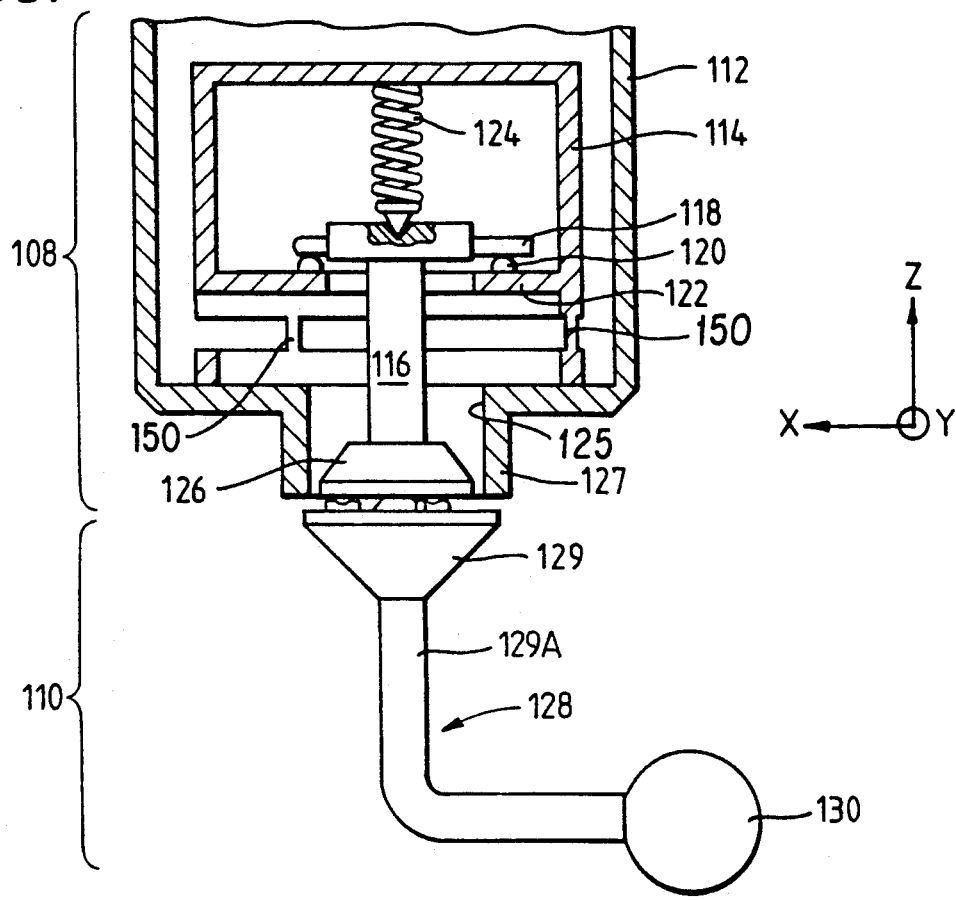
FIG. 5 shows a second embodiment of a stylus changing probe.

A second embodiment of probe according to the present invention is illustrated in FIG. 5 and comprises a retaining module 108, and a task module 110. The retaining module 108 has a fixed structure provided by a cylindrical housing 112 in which a strain-sensitive load cell in the form of a cylindrical cage 114 is supported on pillars 150. A retaining member 116 is supported in the cage 114 by three rollers 118 connected to the retaining member 116, equispaced, and radially extending with respect to axis A of the member 116. Each of the rollers 118 seat in the convergent surfaces defined by an adjacently positioned pair of balls 120 supported on an inwardly depending annular flange 122 of the cage 114, and a spring 124 biases the retaining member 116 into the kinematic location relative to the cage 114 defined by rollers 118 and balls 120. The retaining member 116 projects through an aperture 125 in the base of the housing 112, and terminates in frusto-conical flange 126, which lies within a bore defined by a downwardly depending skirt 127. The task module 110 in the form of a stylus 128, comprises a supporting body 129, a stem 129A and a spherical measuring tip 130, and is releasably mountable on the retaining member 126; a magnetic coupling identical to the one illustrated and described with reference to FIGS. 3 and 4 being provided for this purpose.

As with the previous embodiment, when the machine is operated to bring sensing tip 130 into contact with a surface strain in the stylus 128 and the retaining member 116 is transmitted to the cage 114 and pillars 150 causing strain gauges (not shown) thereon to output a signal which may be used to determine the position of the surface. Overtravel is initially accommodated by displacement of the retaining member 116; one or more of the rollers 118 lifting from its seat with the convergent surfaces provided by the pairs of balls 120. However, movement of the supporting member 116 is limited in the X-Y plane by the skirt 127, in order to protect the strain gauges from becoming damaged due to excessive overtravel of the probe (and thus excessive biasing force from spring 124). Any further overtravel of the probe beyond the point at which movement of the retaining member 116 in the X-Y plane is restricted by the skirt 127 is accommodated by partial breaking of the magnetic coupling between the flange 126 and the supporting body 129 of the stylus 128 (as in the first embodiment).

As can be seen from FIG. 5, the stylus 128 has a stem configured to enable measurements to be made by driving the tip 130 against a surface in the +Z direction, so that the tip will move in the −Z direction relative to the probe housing 112. Such movement is also accommodated by the magnetic coupling, typically by tilting of supporting body 129 relative to retaining member 116. Thus, although the retaining member 116 is supported on the cage 114 via a mechanical location out of which it is operatively deflectable, the number of mechanical locations required to produce a probe capable of performing measurements in ±X,Y and Z directions, as well as stylus exchange operations has been reduced from three to two. In a modification of FIG. 5 which achieves the same operational result, the retaining member 116 is fixedly connected to the housing 112 (via cage 114), the supporting body 129 is magnetically located on the retaining member 116, and the stylus is supported on the supporting body 129 in a repeatable rest position out of which it may be displaced.

Figure 6:
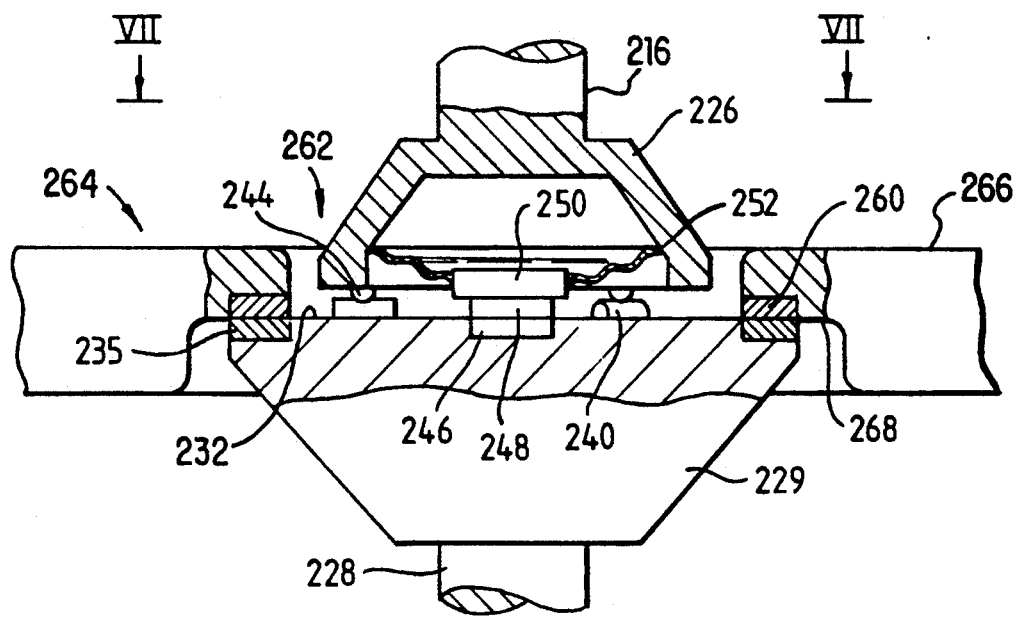
FIG. 6 shows a detail of FIG. 5 together with a part of a second embodiment of a magazine.

An alternative embodiment of releasable magnetic coupling is illustrated in FIG. 6 and comprises a stylus 228 having a supporting body 229 provided at the upper end. The supporting body 229 has a circular face 232, which supports three rollers 240, equispaced and radially extending with respect to axis A of the stylus 228. The retaining member 216 has a flange 226 in the form of a cup and supports three pairs of balls 244 which are positioned such that each of the rollers 240 may seat in the convergent surfaces defined by adjacent pairs of balls 244. The stylus 228 is releasably coupled to the retaining member 216 by a magnet 246 supported on supporting body 229 which attracts a further magnet 248 supported on the retaining member 216. The magnet 248 is supported on a block 250, which is in turn supported by a resilient diaphragm 252. Diaphragm 252 permits linear movement of the magnet 248 in a direction substantially parallel to the axis A, thus enabling the magnet 248 to come into contact with the magnet 246. With this arrangement therefore, the biasing force which causes the stylus 228 to return to its kinematic location with respect to the retaining member 216 is provided by the diaphragm 252, while the retaining force between the retaining member 216 and the stylus 228 is provided by the magnets 246,248. It should be noted that either of the coupling mechanisms described in FIGS. 4 and 6 may be used with either of the probes described in FIGS. 1 and 5.

Figure 7:
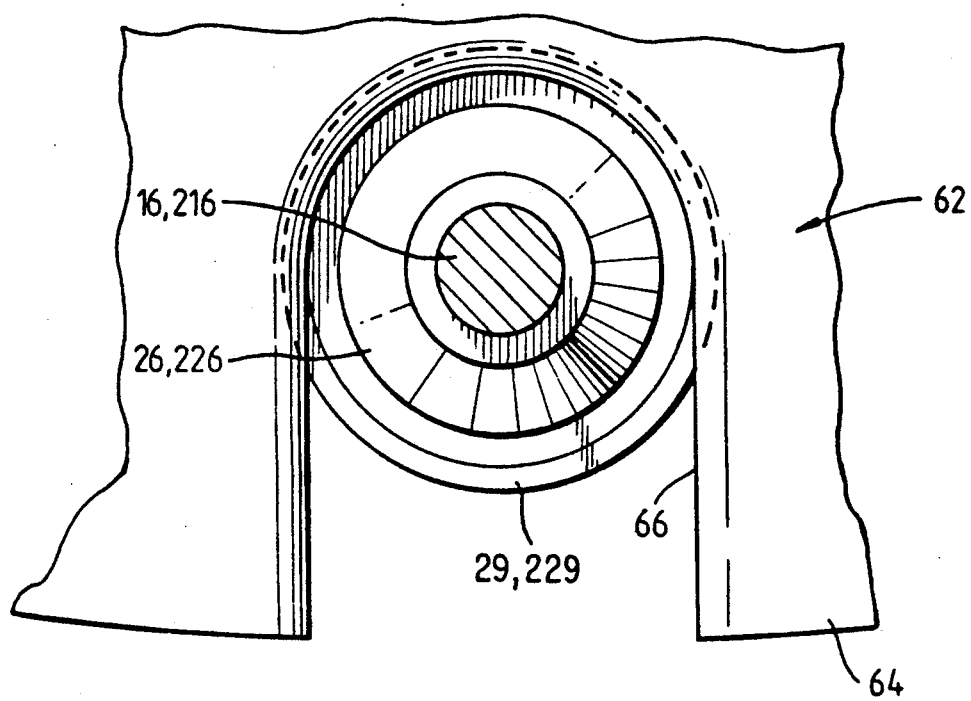
FIG. 7 shows an elevation on VII—VII in FIGS. 4 and 6.
Figure 8:
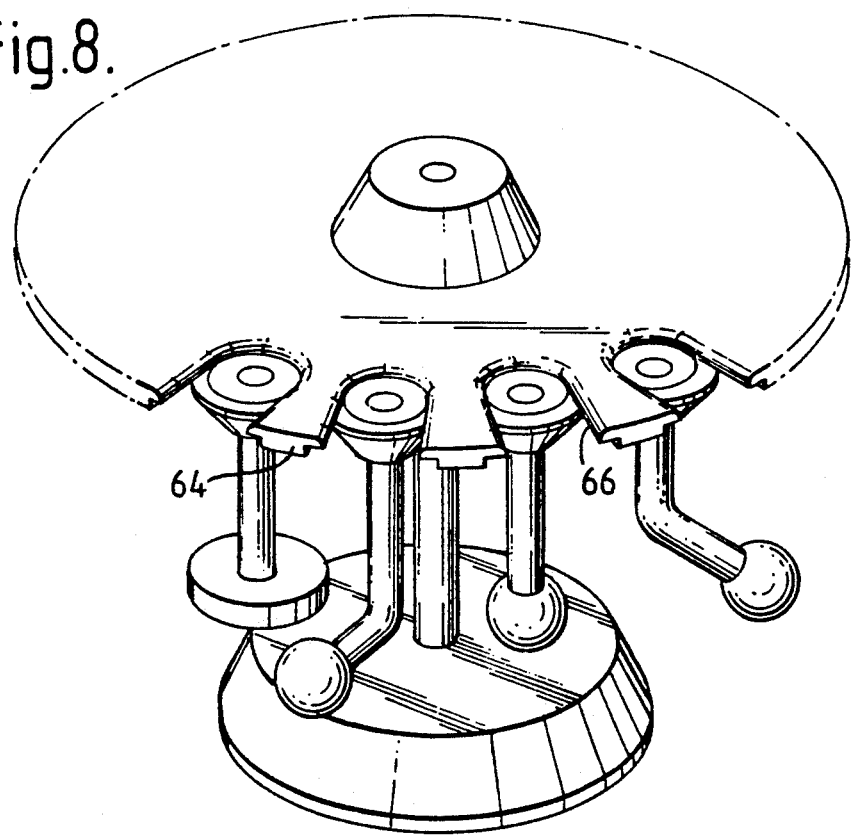
FIG. 8 shows a perspective view of a magazine.

As previously mentioned, magnetic coupling between a retaining member 26;116 and a stylus 28;128 enables the exchange of one stylus 28;128 for another during a probing operation (for example to enable a measuring tip 30;130 to be brought into contact with different geometrical features on a workpiece). A storage system enabling exchange of styli with the design of probe described above will now be described. Referring initially to FIGS. 4 and 7 the support body 29 of stylus 28 supports an annular magnet 60 on the periphery of its circular face. The magnet 60 acts to retain the stylus 28 in a storage port 62 of a magazine 64 (also shown in FIG. 8). Each storage port 62 comprises a support structure provided by a lip 68 which defines a pair of jaws 66 enclosing a substantially semi-circular aperture. The spacing of the jaws 66 is smaller than the radius of the face of the support body 29, thus enabling the support body 29 to be retained magnetically on the lip 68.

The flange 26 of the retaining member 16 on the retaining module may nonetheless engage the supporting body 29 by virtue of the fact that the radius of the flange 26 is smaller than the radius of the aperture enclosed by jaws 66. An exchange operation may be performed by driving the machine to move the retaining member 26 into engagement with the supporting body 29, so that each of the rollers 40 seats in the convergent surfaces defined by an adjacent pair of balls 44, and in a continuous downward movement disengaging the supporting body 29 of the stylus 28 from the lip 68 so that the magnet 60 no longer retains the stylus 28 in the storage port 62 of the magazine 64.

An alternative but equivalent embodiment is described in FIG. 6, in which a magnet 260 is provided on the magazine 264. As with the previous embodiment, the magazine 264 comprises a plurality of storage ports 262 each of which comprises a support structure provided by a lip 268, which defines a pair of jaws 266. The supporting body 229 of stylus 228 is retained in the storage port 262 by attraction of a ring 235 of ferromagnetic material at the periphery of the face of the supporting body 229 by the magnet 260. The exchange operation is as described previously. A detent mechanism may be provided to accurately locate the supporting body 229 with respect to the magazine.

N.B. These magazines and exchange operations may not be used with the design of FIG. 5, due to the skirt 127.

In a modification, crash protection mechanisms (such as are described in PCT/GB91/00293) may be provided to protect the magazine.

A further modular design of probe will now be described with reference to FIG. 9. A touch probe includes a retaining module in the form of a sensing module 312 and a task module in the form of a stylus module 314 releasably mountable thereon. The stylus module 314 comprises an upper casing 316 and a lower casing 318, retained together by three bolts 320 and associated spacers 322, and enclosed by an intermediate floating skirt 324. A stylus supporting member 326 is biased into a kinematic rest position with respect to the lower casing 318 by a spring 328. The supporting member 326 is displaceable out of the rest position against the biasing action of the spring 328 thus enabling tilting of the stylus to accommodate overtravel of the probe.

The sensing module 312 comprises a fixed structure in the form of a cylindrical housing 330 and a load cell 332 supported thereon. The load cell 332 includes a first part provided by a triangular cross-section cage 334 and a second part provided by a retaining ring 336; the two parts 334,336 are interconnected by an area of weakness provided by three pillars 338 upon which semiconductor strain gauges (not shown) are mounted. The stylus module 314 is releasably mounted in a kinematic location on the sensing module 312 by engagement between a set of kinematic engagement elements on the retaining ring 336 with a set of kinematic engagement elements on the upper casing 316. The respective sets of elements are held in engagement by the attraction between magnets 340,342 provided in the upper casing 316 of the stylus module 314 and the retaining ring 336 of the sensing module 312. Thus far, such a probe is known per se and described in our co-pending European Patent Application No. 92301504.4 (now EP 501710).

A detector is provided on the sensing module 312 to detect when the stylus module 314 is mounted thereon. Referring again to FIG. 9, the detector includes a plunger 350 movable within a bore 352 provided in the magnet 342. The plunger 350 has an elongate body 354 which extends within the bore 352, with a soft iron collar 356 supported thereon at its upper end. The collar 356 has a downwardly depending skirt 358 which is urged by the attractive force between the magnet 342 and the soft iron material of the collar 356 into contact with appropriate electrical connections provided upon a printed circuit board 360, supported on the rearwardly extending face of the retaining ring 336. When the stylus module 314 is mounted on the sensing module 312, the clearance between the magnets 340,342 is such that the lower end of the plunger is urged upwardly, and the soft iron collar 356 lose contact with the circuit board 360 (the attraction force between the magnets 340,342 exceeding the attraction force between the magnet 342 and the collar 356).

Thus, when a stylus module 314 becomes disconnected from the sensing module 312, the skirt 358 completes a circuit provided upon the circuit board 360 and an alarm signal is sent to the machine control causing it to brake movement of the movable arm. Conversely, when the stylus module 314 is connected to the sensing module 312 the circuit on the circuit board 360 is broken and no alarm signal is emitted thus enabling the machine to operate normally.

Figure 9:
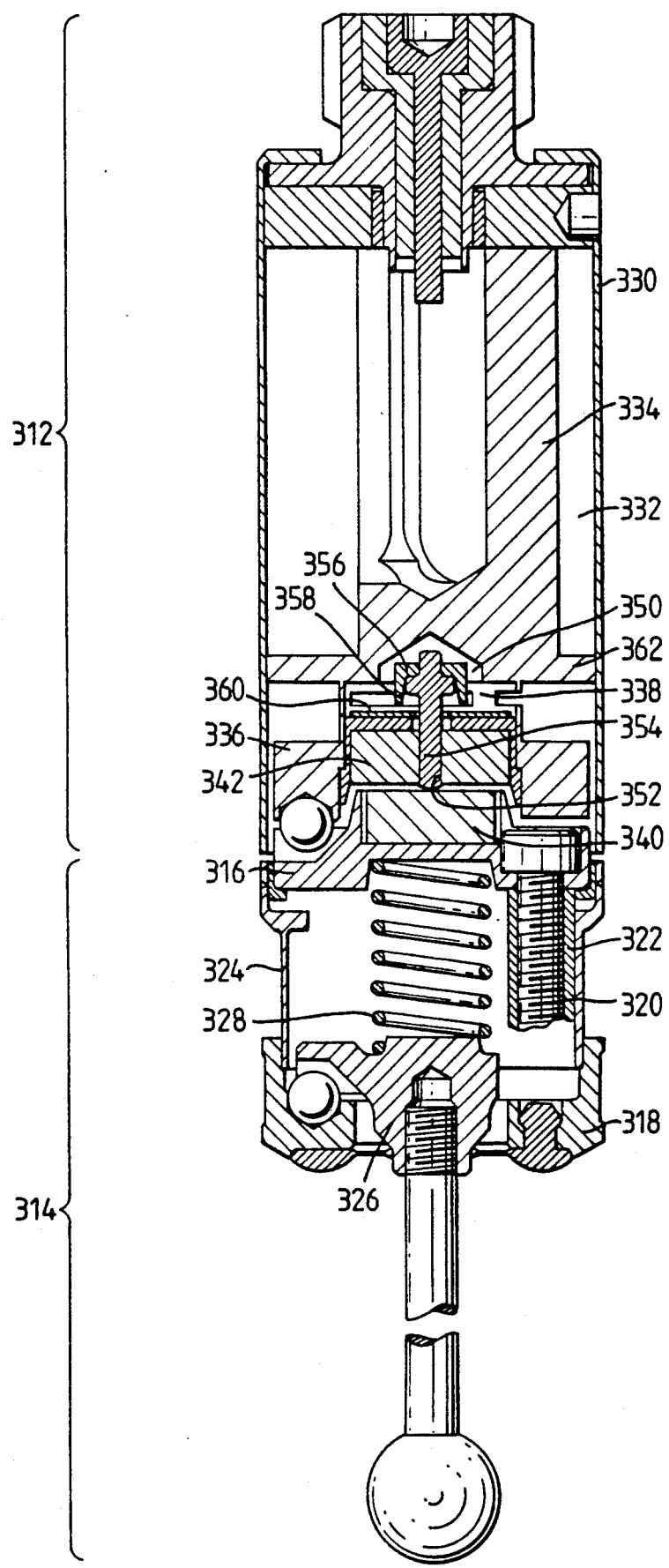
FIG. 9 is a section through a modular design of stylus changing probe.

An example of a magazine suitable for use with the probe construction of FIG. 9 is shown in FIGS. 10-15. The magazine comprises a number of modular storage ports 400 each of which is connectable to an adjacent port or, where appropriate, to an adjacent electronics module 402,404A and 404B. Each of the ports 400 has a support structure comprising a base 410 and a pair of jaws in the form of docking inserts 414 supported on the base 410. Each of the inserts has an edge 416 extending proud of the base 410 in the direction of the adjacent docking insert 414. The edge surfaces 416 extend substantially parallel to each other. A lid 412 is provided in respect of each storage port 400 to protect the engagement elements on the upper casing of the stylus module 314 from contamination by e.g. dust. The lid 412 is pivotally connected to the base 410 via a hinge 413 to enable the lid 412 to lift and therefore expose the engagement elements. A permanent magnet 418 is provided on the upper surface of each docking insert 414 to retain a stylus module 314 in a storage port 400.

Figure 11:
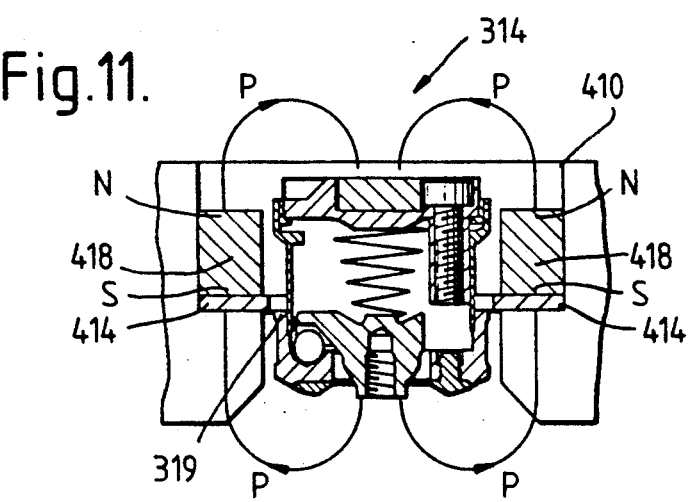
FIG. 11 shows a detail of FIG. 10.

The mechanism of retention of a stylus module 314 in a storage port 400 is shown in more detail in FIG. 11. The lower casing 318 of the stylus module 314 terminates at its upper end in a circular lip 319, whose diameter is greater than the diameter of the floating skirt 324. The spacing between the edge surfaces 416 is greater than the diameter of the floating skirt 324, but smaller than the diameter of the lip 319, thus allowing the stylus module 314 a degree of movement in a vertical direction which equals the distance between the upper and lower casings 316,318. The magnet 418 urges the lower casing upward, bringing the lip 319 into engagement with the docking inserts 414. The upper and lower casings 316,318 are of ferromagnetic material (e.g. steel) which, in conjunction with docking inserts 414 and magnets 418 creates a magnetic flux path as indicated by arrows P. The floating skirt is of non-ferromagnetic material to prevent magnetic forces interfering with its operation.

Figure 12:
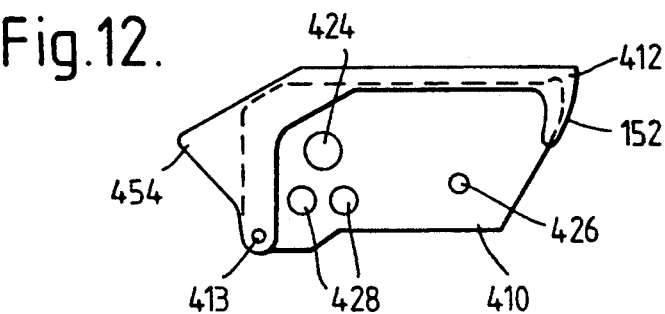
FIG. 12 is a side view of a storage port.
Figure 13:
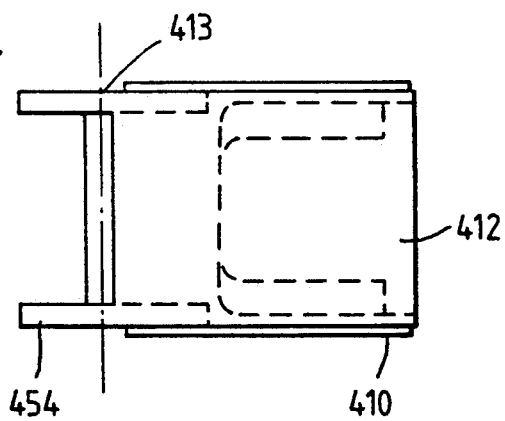
FIG. 13 is a plan view of the port of FIG. 12.
Figure 14:
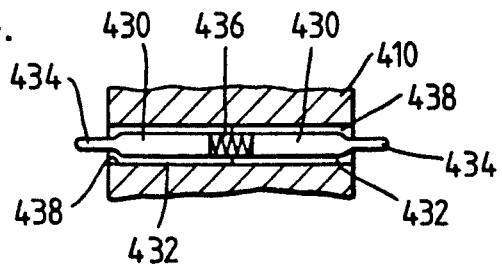
FIG. 14 shows a detail of FIGS. 12 and 13.

As mentioned earlier, the magazine is provided with a detection system to detect the presence of a sensing module 312 during a stylus changing operation, and to emit a signal which inhibits the alarm signal generated when a stylus module 314 becomes disconnected from the sensing module 312. The detection system comprises three electronic modules: a central module 402 and two end modules 404A,B. Each port 400 may be connected to an adjacent port 400 by means of a bolt 424 and a locating pin 426, and electrical connection between the centre module 402 and end modules 404A,B is provided by a pair of spring loaded contacts 428 on each port 400. Referring now to FIGS. 12-14, each of the contacts 428 comprises a pair of metal plungers 430 each movable within a corresponding sleeve 432 supported in the base 410 of the port 400. Each of the plungers 430 has a narrow contact end 434 terminating in a semi-spherical tip. A conducting helical spring 436 biases the plungers 430 away from each other thus urging the contact ends 434 out of the respective sleeve 432; reduced diameter portions 438 of each sleeve 432 retain the plungers in the base 410. The identical configuration of each plunger 430 in a given spring loaded contact 428 means that each port 400 can be constructed identically, and that each port 400 may be used on either side of the central electronic module 402.

End module 404A generates a pair of light beams 450. End module 404B has a photodetector situated to detect each of the light beams 450 and output a signal accordingly. When a sensing module 312 moves into the path of a beam, the obstruction of the beam causes the electronic circuitry to emit an inhibit signal. This signal inhibits the alarm signal, and thus prevents the machine control from braking movement of the movable arm because the stylus module 314 has become disconnected during the course of a stylus changing operation.

Figure 15:
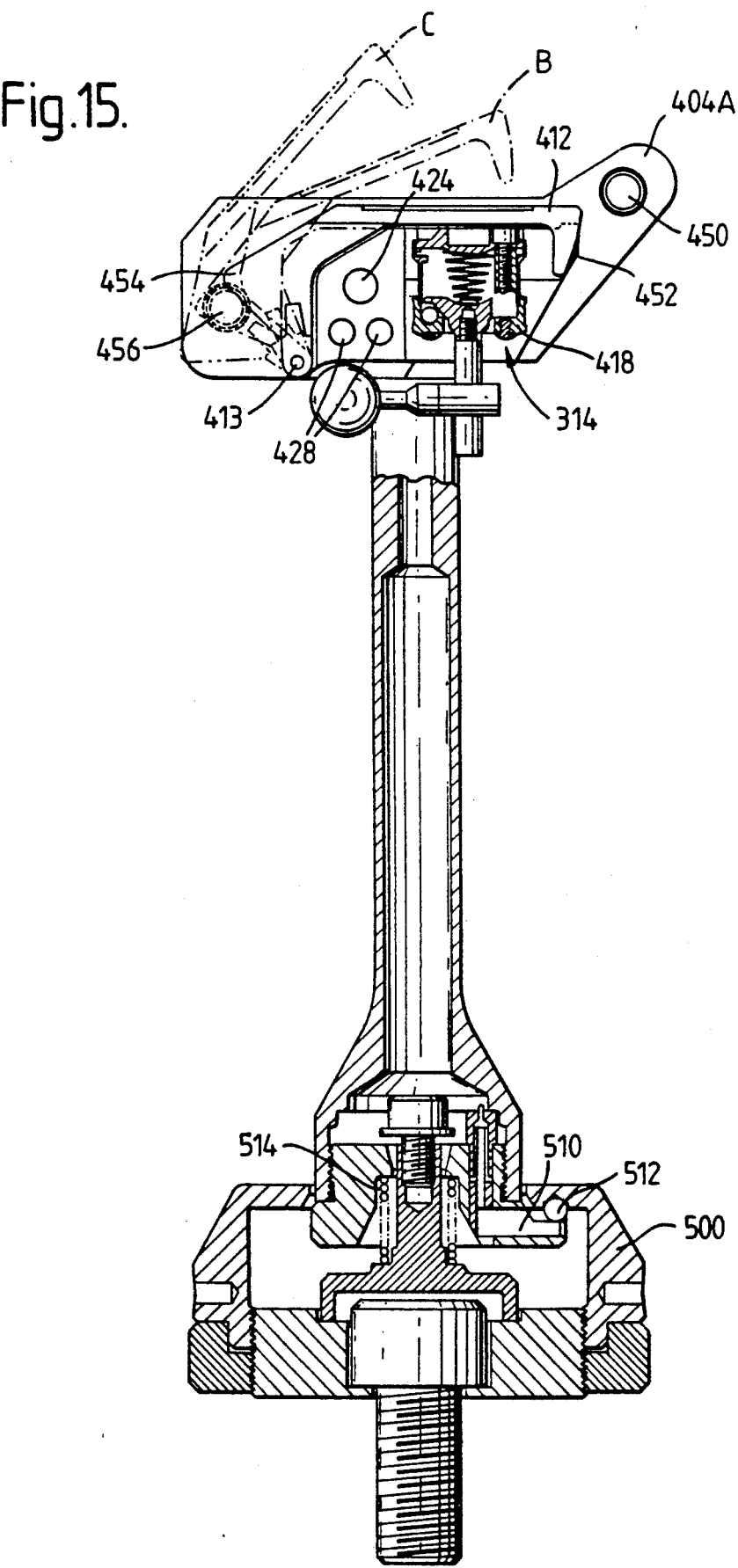
FIG. 15 is a side view of the magazine of FIG. 11.

Referring now in particular to FIG. 15, light beam 450 provided at the front of the magazine is obstructed by a probe as it approaches a port 400. The electronic circuitry in the modules 402,404A,B thus emits an override signal preventing any braking movement of the machine. (N.B. The override signal is necessary at this particular point since a trigger signal may be emitted from the strain gauges as a result of the small shock caused by contact between the housing of the sensing module 312 and the front of the lid 412. When the sensing module 312 comes into contact with the lid 412, the curved profile of its forward face 452 causes it to pivot upwards as the sensing module 312 moves to the left in FIG. 15. This upward pivoting of the lid 412 causes a flange 454, provided at the rear of the lid to encroach in the path of light beam 456. When the lid 412 has been tilted to position B in FIG. 15, it can be seen that the flange 454 now completely obstructs the beam 456. The obstruction of beam 456 by flange 454 ensures the continued emission of an override signal as the probe moves out of the path of beam 450. Further movement of the sensing module causes continued tilting of the lid 412 to position C in FIG. 15, whereupon the sensing module 312 may move upwards thus engaging the lip 319 of the lower casing 318 of the stylus module 314 with the docking inserts 414. By Newton's third Law of Motion, the docking inserts 414 apply a downward reaction force to the lower casing 318 to hold it in place, so that continued upward movement results in breaking of the magnetic connection between the sensing module 312 and the stylus module 314. The alarm signal emitted from the probe at this point due to disconnection of the sensing module from the stylus module 312 is overridden by the inhibit signal from the modules 402,404A,B due to the continued obstruction of beam 456. The stylus module 314 then moves back to the right in FIG. 15 until the lid 412 is closed over the port 400. At this position the sensing module 312 obstructs the light beam 450. The sensing module 312 may then move along the magazine until it is adjacent a further port 400, whereupon it may perform a docking operation with a further stylus module.

In a docking operation the movable arm of the machine is operated to drive the sensing module 312 initially in a horizontal direction. In the course of this movement the sensing module 312 will come into contact with the lid 412 which, because of the geometry of its front surface will be lifted up by the sensing module to expose the engagement elements on the upper casing 316 of the stylus module 314. The horizontal movement of the sensing module 312 continues until the engagement element of the sensing and stylus modules 312,314 lie in register with each other. The sensing module 312 is then moved downward. During this downward movement, the two sets of engagement elements come into engagement, and the stylus module 314 simultaneously becomes disengaged from the storage port 400. The downward movement of the sensing module 312 (which now carries a stylus module 314) is then arrested and the probe moved horizontally out of the storage port 400.

In order to prevent damage to the pillars 338 (and strain gauges provided thereon) within the sensing module 312 when the housing 330 comes into contact with the magazine, a reaction flange 362 is provided at the base of the triangular cage 334. The flange 362 has a relatively tight tolerance with respect to the inner diameter of the housing 330, thus any deformation of the housing 330 due to contact with a lid 412 will react initially against the flange 362 rather than the retaining ring 336.

The magazine is mounted upon an overtravel mechanism which enables displacement of the magazine relative to the base 500 on which it is supported, so that in the event of accidental collision between the sensing module 312 and, for example, the electronic module 402, the magazine may tilt out of its position with respect to the base 500. The overtravel mechanism for the magazine is provided by three rollers 510, each of which seat in the convergent surfaces provided by an adjacent pair of balls 512. A biasing spring 514 urges the rollers 510 into engagement with the balls 512. The rollers 510 and balls 512 are wired in a series electrical circuit to detect movement of the magazine from the rest position relative to the base 500 and to emit a signal braking movement of the movable arm of the machine in the event of such a displacement.

To enable exchange of one magazine for another, the base 500 has three radially extending apertures which allow the rollers to be disengaged from the balls 512 under the influence of a force in opposition to the biasing force provided by the spring 514, and the magazine to be rotated about its axis until the rollers 510 lie in register with the aforementioned apertures, whereupon the magazine may be removed from the base. Such a changing mechanism is more fully described in our U.S. Pat. No. 4,349,946.

Figure 10:
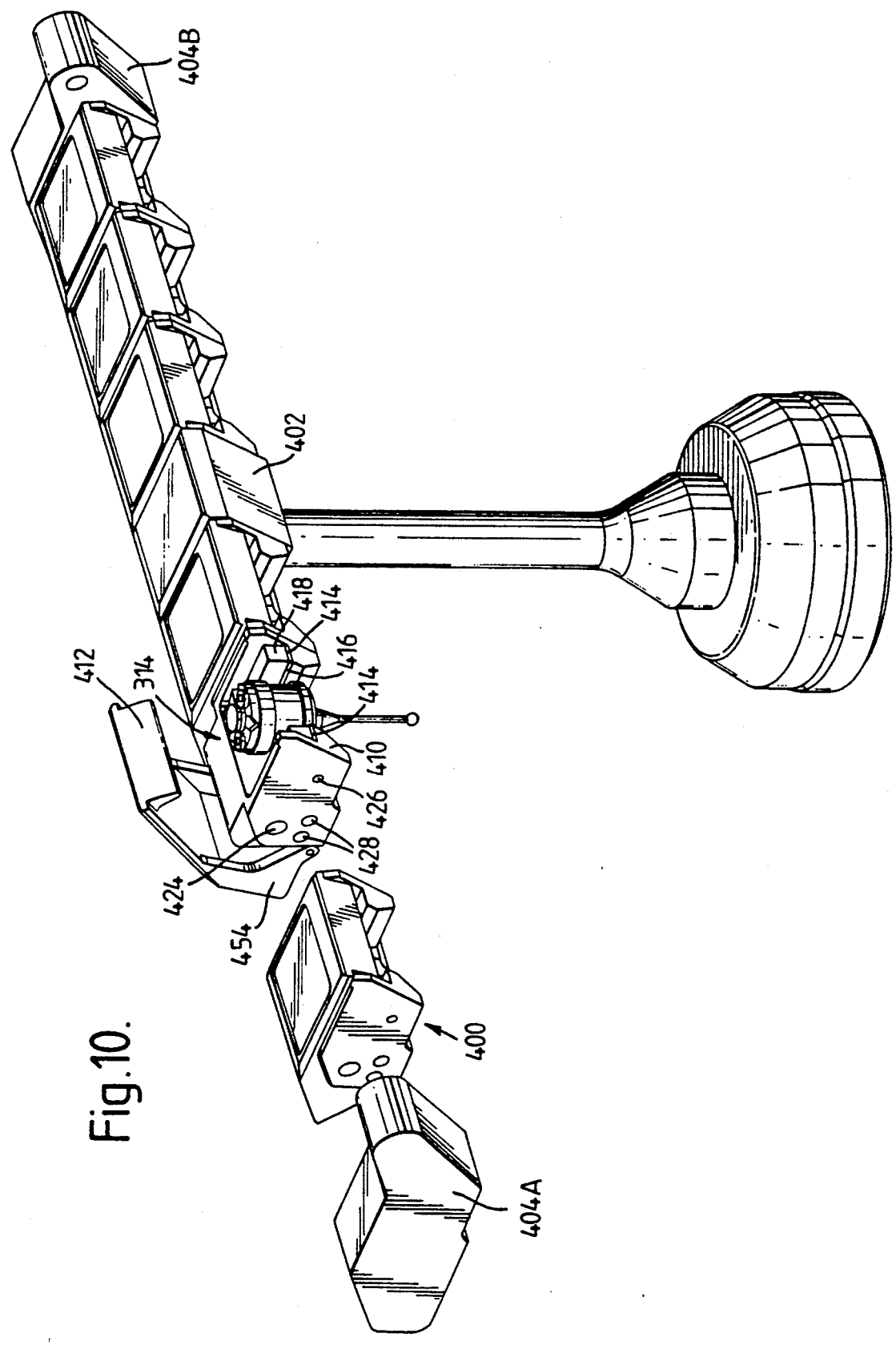
FIG. 10 is a perspective view of a third embodiment of magazine.
Figure 16:
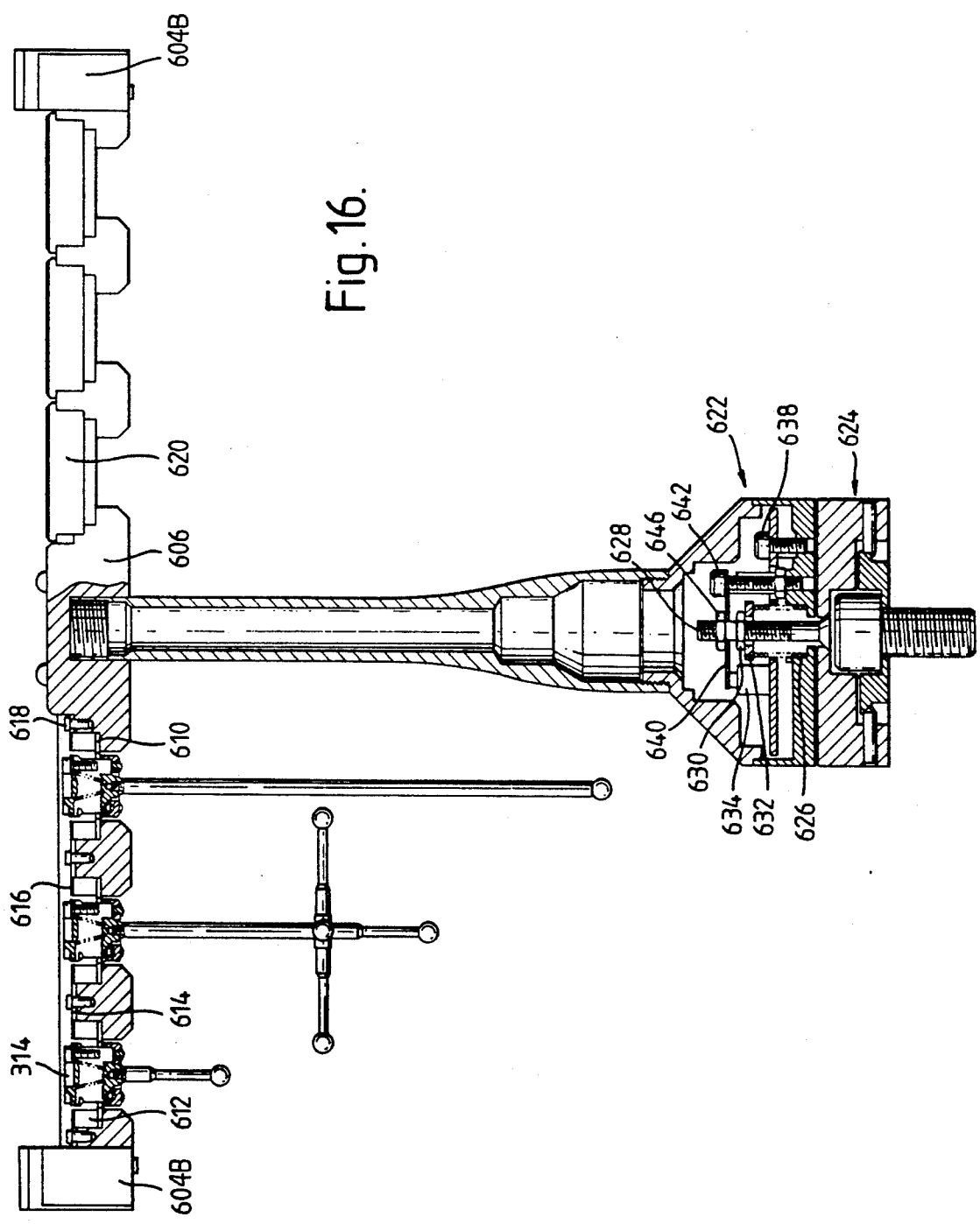
FIG. 16 is a front view of a fourth embodiment of magazine.
Figure 17A:
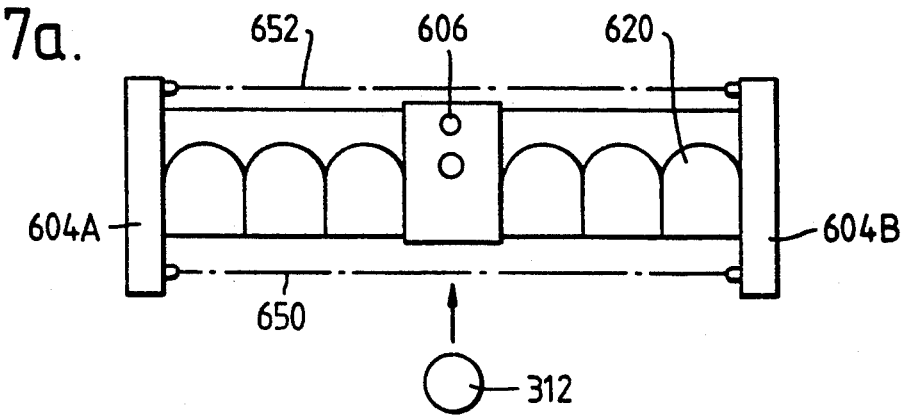
FIGS. 17a-d are schematic views of a stylus changing operation with the magazine of FIG. 16.
Figure 17B:
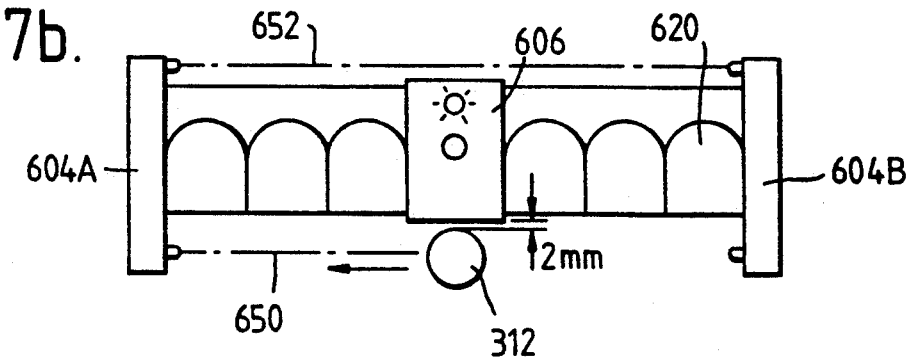
Figure 17C:
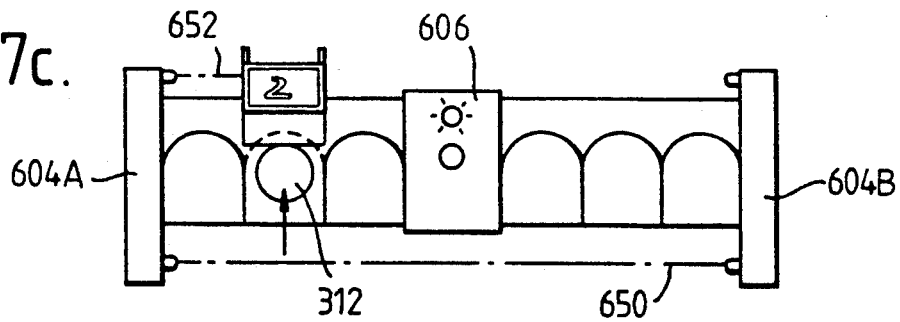
Figure 17D:
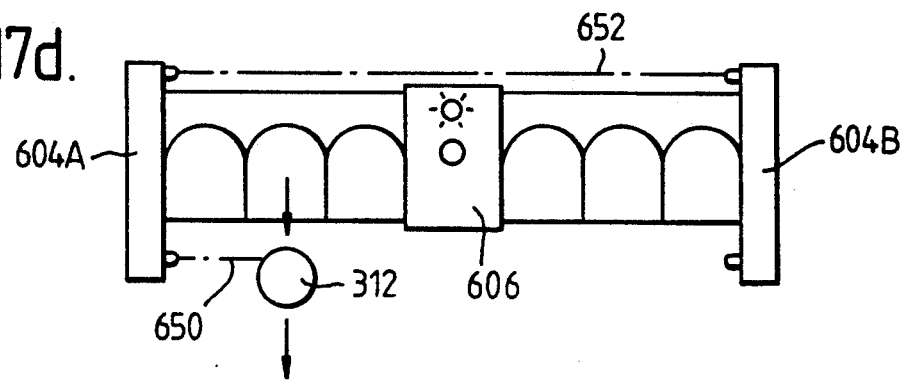

A modified form of the magazine shown in FIG. 10 will now be described with reference to FIG. 16. The magazine of FIG. 16 additionally comprises a central electronics module 606 which includes a Hall Effect or magnetic reed switch to detect the presence of a sensing module (due to the magnet 342 in the sensing module). Other suitable sensors which detect the presence of a ferromagnetic material may also be used. The magazine of FIG. 16 also differs from the magazine of FIG. 10 in that the body of the magazine is machined from a single piece of aluminium. Docking inserts 610 support permanent magnets 612 which are retained in position by a spacer 614 and a retaining plate 616, fastened in place by retaining screws 618. An individually movable lid 620 is provided in respect of each storage port. The base of the magazine has a top housing 622 biased into a kinematic rest position with respect to a bottom housing 624 by the action of a compression spring 626 held in place by clamping screw 628, nut 630 and washer 632. A microswitch 634 is supported on a printed circuit board, which is in turn retained in the base of the upper housing 622 by three retaining bolts 638. Also retained in the base of the housing 622 is a planar contact spring 640, supported on a further bolt 642. The free end of the contact spring 640 lies adjacent the microswitch 634, and the displacement of this free end from the microswitch can be adjusted by means of an adjusting nut 646 provided on screw 628. In the event of a crash between, for example, the movable arm and the magazine, the magazine will be allowed to tilt relative to the base 624 against the action of the compression spring 626. This tilting motion will cause the planar contact spring 640 to come into contact with the microswitch 634 which will then emit a crash signal arresting movement of the movable arm.

A changing operation with the modified form of magazine will now be described with reference to FIGS. 17a-d. In order to cause the magazine to emit an inhibiting signal preventing the sensing module from emitting an alarm signal when a stylus module becomes detached therefrom, the Hall Effect sensor provided in the central electronics module 606 must be actuated, and one of the light beams 650,652 emitted between electronic modules 604A and 604B, simultaneously obstructed. Initially, therefore during a stylus changing operation, the sensing module must always approach the central electronics module in order to actuate the Hall Effect sensor. Inevitably the sensing module 312 will simultaneously obstruct the light beam 650, thus causing the magazine to emit an inhibit signal. The sensing module 312 is then moved along the magazine into a position adjacent the requisite storage port (FIG. 17b), and during this operation the light beam 650 remains obstructed, causing the continued emission of an inhibit signal. As the sensing module 314 is moved into position to engage a stylus module, the flanges at the rear of the lid 620 obstruct the light beam 652, even though the sensing module 312 now moves out of the path of the light beam 650; the inhibit signal is therefore continually emitted. Once a stylus changing operation is complete the sensing module 312 is then moved directly away from the particular storage port in question. Both the beams 650,652 are then remade and the inhibit signal from the magazine ceases. The probe is then re-enabled, allowing the alarm signal from the sensing module 312 (in the event that the stylus module 314 becomes disconnected therefrom) to be emitted.

This modified form of magazine, with two independent sensing devices to detect the presence of a sensing module during a stylus changing operation, prevents the emission of an inhibit signal when only one of the light beams is obstructed. This removes the possibility that the inhibit signal will be emitted while the beams are obstructed by a machine operators hand for example.

In a further modification, the inhibit signal is emitted once the Hall Effect sensor has been actuated, and provided one of the light beams is not unobstructed for a time period exceeding e.g. 5 seconds. This allows a stylus changing operation where the stylus has a star configuration and the probe therefore cannot be moved along the magazine in the path of the light beam 650 without colliding with other stylus modules, or the magazine itself. In yet a further modification a Hall Effect sensor is provided in respect of each storage port, thereby obviating the need for the rear beam, or the requirement that the sensing module 312 visit the central module 606 before each stylus changing operation.

A further aspect of the present invention relates to the mounting of a magazine on a coordinate positioning machine such as a coordinate measuring machine.

Figure 18:
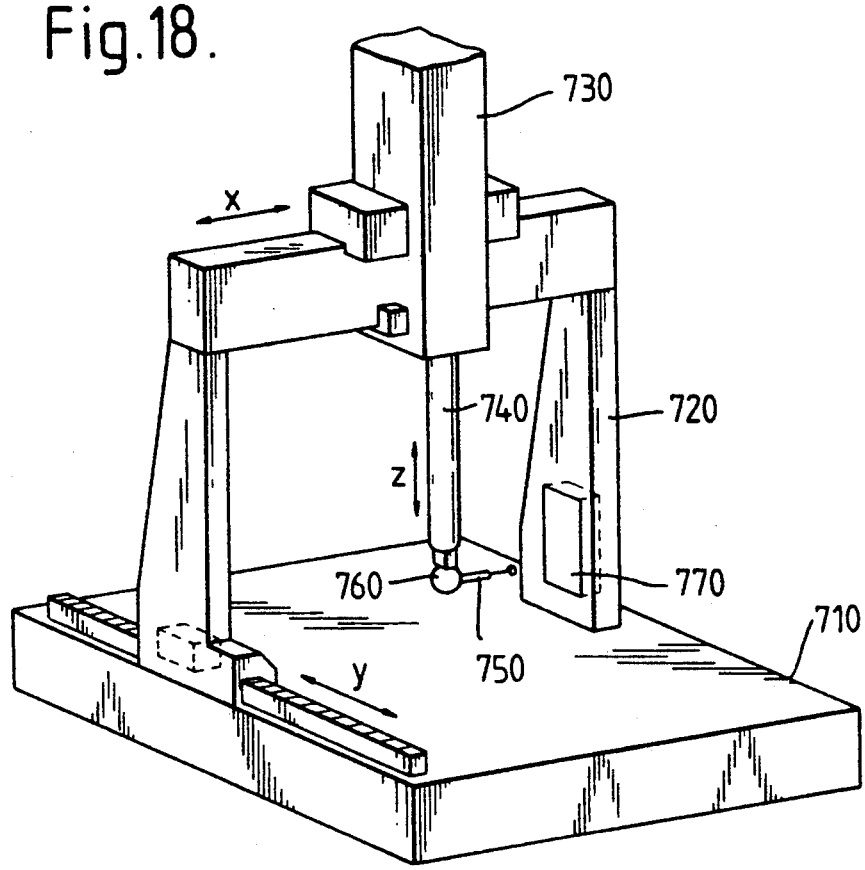
FIG. 18 is a perspective view of a coordinate measuring machine incorporating a fifth embodiment of magazine.
Figure 19:
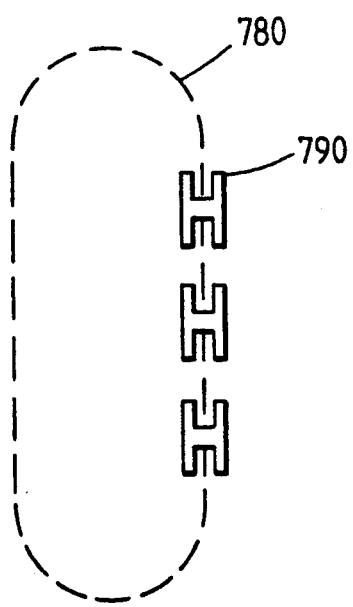
FIG. 19 is a detail of FIG. 18.

Referring now to FIG. 18, a coordinate measuring machine comprises a table 710 along which a bridge 720 moves in a direction defined as the Y direction. A carriage 730 is supported on the bridge for movement relative to the bridge in the direction defined as the X direction, which is orthogonal to the Y direction, and a movable arm 740 is movable within the carriage relative to both, the carriage 730 in a direction defined as the Z direction. Thus, a support structure for the movable arm 740 comprising the bridge 720 and the carriage 730 provides movement of the movable arm 740 in three dimensions relative to the table 710. In an alternative, and entirely equivalent construction of the coordinate measuring machine, the bridge 720 is stationary and the table 710 moves in the X and Y directions relative to the bridge. An inspection probe 750 is supported at the end of the movable arm 740 via a probe head 760, which provides orientation of the probe 750 relative to the movable arm 740 about two orthogonal rotational axes.

Traditionally, a magazine is supported on the table 710 of a coordinate measuring machine. However, in this embodiment of the present invention, the magazine is supported inside a cavity 770 provided in the bridge 720 of the machine. The magazine supported inside the cavity 770 may be of the type illustrated in e.g. FIG. 10. Alternatively, if free access by the probe 750 to all of the ports of the magazine is not possible, a storage port may be supported on a conveyor belt 780. The conveyor belt 780 is driven by motors (not shown) which circulate the ports 790 until the appropriate port is accessible by the probe 750.

Retaining the magazine in the bridge 720 of the machine has several advantages. Firstly, the total available volume of the machine which may be used to inspect parts is increased substantially by removing the magazine from the table 710. Secondly, an exchange operation may be performed while the bridge 720 is moving from one end of the table 710 to another, thus speeding up substantially the cycle time required to perform a measurement operation.

We claim:

1. A coordinate positioning machine having an arm and a table movable relative to each other; a retaining module provided on the arm, having a first set of engagement elements; at least one task module stored within the working area of the machine, said task module having a second set of engagement elements which are releasably engageable with said first set of engagement elements on said retaining module; a magazine having a plurality of storage ports each for storing a said task module; means for magnetically urging said task module into engagement with said storage port in a first direction; wherein said retaining module, said task module and said storage port are configured so that, when said task module is retained in said storage port, the second set of engagement elements on the task module are accessible to the first set of engagement elements on the retaining module from a direction opposite to the first direction, and so that, when first and second elements are engaged, the retaining module may carry the task module away from the storage port in a second direction, transverse to the first direction.

2. A machine according to claim 1, wherein each storage port comprises a pair of jaws extending in said second direction.

3. A machine according to claim 2, wherein said task modules have an upper and a lower casing, and a neck extending therebetween, said second set of engagement elements being provided on said upper casing, and wherein the jaws of said storage ports have a spacing wider than the neck and narrower than the lower casing so that when said task module is retained in said storage port, the lower casing is magnetically urged into engagement with the jaws on one side thereof, the neck extends between the jaws, and the upper casing lies on the other side of the jaws.

4. A machine according to claim 2 wherein said task module includes a supporting body on which said second set of engagement elements are provided, and said retaining module has a retaining member on which said first set of engagement elements are provided, and wherein the jaws of said storage ports have a spacing narrower than the supporting body and wider than the retaining member, thereby enabling said retaining member to pass between said jaws to engage said supporting body.

5. A machine according to claim 1, wherein said magnetic urging means is provided on the magazine.

6. A machine according to claim 5 wherein said magnetic urging means is a permanent magnet.

7. A magazine for use on a coordinate positioning machine, the magazine containing a plurality of task modules each having a set of engagement elements, to enable engagement of a task module by a retaining module provided on a movable arm of the machine, performance of an operation by the machine using said task module, and return of said task module to the magazine, the magazine comprising:
a plurality of storage ports each for retaining a said task module, each storage port having a pair of jaws extending in a first direction;
means for magnetically urging a said task module into engagement with said jaws in a second direction, transverse to said first direction;
wherein the spacing of said jaws, and the configuration of said task modules is such that said engagement elements are accessible from a direction opposite to said first direction and said task modules are disengageable from said storage ports against the action of said magnetic urging means in said direction opposite to said first direction.

8. A magazine according to claim 7 wherein said task modules have: an upper and a lower casing, a neck extending therebetween, and a set of engagement elements provided on the upper casing, wherein the jaws of said storage ports have a spacing wider than the neck and narrower than the lower casing, so that when said task modules are retained in said storage port, the lower casing is magnetically urged into engagement with the jaws on one side thereof, the neck extends between the jaws, and the upper casing is on the other side of the jaws.

9. A magazine according to claim 7, wherein said task module includes a supporting body on which said second set of engagement elements are provided, and said retaining module has a retaining member on which said first set of engagement elements are provided, and wherein the jaws of said storage ports have a spacing narrower than the supporting body and wider than the retaining member, thereby enabling said retaining member to pass between said jaws to engage said supporting body.

10. A method of operating a coordinate positioning machine having an arm and a table movable relative to each other; a retaining module provided on the arm; a plurality of task modules, each releasably engageable with the retaining module; a magazine having a plurality of storage ports each of which retains a said task module, each storage port having a pair of jaws; the method comprising the steps of sequentially:

engaging said task module with said retaining module, by magnetically urging said task module onto said retaining module;

operating the machine to perform an operation with said task module;

operating the machine to bring the task module into engagement with the jaws of a storage port;

operating the machine to move the retaining module away from the storage port in a direction opposite to the direction of the magnetic attraction force between the retaining module and task module; wherein during said movement of the retaining module away from the storage port the jaws of the storage port apply a reaction force to said task module, equal and opposite to the said magnetic attraction force, thereby retaining the task module in the storage port and enabling disengagement of said retaining module from said task module by virtue of the movement of the movable arm and thus the retaining module.

11. The method according to claim 10, wherein said operation performed by said machine includes measurement of workpiece dimensions.

12. A magazine for retaining a plurality of task modules within the working area of a coordinate positioning machine, each said task module being releasably connectable to a retaining module supported on the movable arm of said machine, the magazine having:

a plurality of storage ports, each for retaining a said task module; and at least one electromagnetic sensor for sensing the presence of at least one of an electric and a magnetic field generated by a said retaining module thereby to detect the presence of a said retaining module lying in a predetermined spatial relationship with the magazine.

13. A magazine according to claim 12, wherein an electromagnetic sensor is provided in respect of each storage port.

14. A magazine according to claim 12 wherein said storage ports are spaced apart in a first direction, and said magazine further comprises light beam generating means and associated detecting means, said light beam extending substantially parallel to said first direction.

15. A magazine according to claim 14, wherein each storage port comprises a pair of jaws defining an opening into said storage port, and wherein said light beam extends across the opening of the jaws.

16. A magazine according to claim 15 further comprising an individually movable cover provided in respect of each storage port, said covers being movable between a first position in which a said task module is covered, and a second position in which said task module is exposed, wherein further beam generating means and associated detecting means are provided, the position of said further beam, and the configuration of said covers being such that said further beam is obstructed by a said cover in the second position.

17. A coordinate positioning machine comprising: a table; an arm supported by a support structure providing relative movement of the table and the arm; a probe supported on the arm, having a retaining module and a task module releasably connectable to the retaining module, the retaining module having means for detecting when a said task module becomes disconnected therefrom, and for generating an alarm signal accordingly to arrest said relative movement of said table and said arm; a magazine having a plurality of storage ports, each for retaining a said task module to enable exchange of one said task module on said retaining module for another; wherein sensing means are provided for sensing the presence of said retaining module in a predetermined spatial relationship with said magazine, and for emitting an inhibit signal accordingly to inhibit said alarm signal and thereby enable said relative movement during the course of an exchange operation.

18. A machine according to claim 17 wherein said sensing means are provided on the magazine.

* * * * *

UNITED STATES PATENT AND TRADEMARK OFFICE
CERTIFICATE OF CORRECTION

PATENT NO. : 5,327,657
DATED : July 12, 1994
INVENTOR(S) : HAJDUKIEWICZ et al.

It is certified that error appears in the above-indentified patent and that said Letters Patent is hereby corrected as shown below:

Column 14, line 58, change "first" to --second--;

Column 14, line 61, change "first" to --second--.

Signed and Sealed this

Sixth Day of December, 1994

Attest:

BRUCE LEHMAN

Attesting Officer     Commissioner of Patents and Trademarks